US012216055B2

(12) United States Patent
Cohen et al.

(10) Patent No.: US 12,216,055 B2
(45) Date of Patent: Feb. 4, 2025

(54) MICROSCOPE IMAGE CAPTURING METHODS

(71) Applicant: President and Fellows of Harvard College, Cambridge, MA (US)

(72) Inventors: Adam Ezra Cohen, Cambridge, MA (US); Vicente Jose Parot, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 353 days.

(21) Appl. No.: 17/568,608

(22) Filed: Jan. 4, 2022

(65) Prior Publication Data

US 2022/0205919 A1 Jun. 30, 2022

Related U.S. Application Data

(63) Continuation of application No. 16/480,953, filed as application No. PCT/US2018/015517 on Jan. 26, 2018, now Pat. No. 11,237,109.

(Continued)

(51) Int. Cl.
*G01N 21/64* (2006.01)
*G02B 21/06* (2006.01)
(Continued)

(52) U.S. Cl.
CPC ......... *G01N 21/6458* (2013.01); *G02B 21/06* (2013.01); *G02B 21/16* (2013.01);
(Continued)

(58) Field of Classification Search
CPC ....... G01N 2021/6419; G01N 21/6408; G01N 21/6458; G01N 2201/0675;
(Continued)

(56) References Cited

U.S. PATENT DOCUMENTS 10,302,927 B2 5/2019 Dake et al.
11,237,109 B2 2/2022 Cohen et al.
(Continued)

FOREIGN PATENT DOCUMENTS

WO 2015/087960 A1 6/2015

OTHER PUBLICATIONS

Hanley et al., "Spectral Imaging in a Programmable Array Microscope by Hadamard Transform Fluorescence Spectroscopy", Department of Molecular Biology, Max Planck Institute for Biophysical Chemistry, Am Fassberg 11, D-37077 GoËttingen, Germany (Year: 1999).*

(Continued)

*Primary Examiner* — Kenny A Cese
(74) *Attorney, Agent, or Firm* — Wolf, Greenfield & Sacks, P.C.

(57) ABSTRACT

The present disclosure relates to spatially modulating the light source used in microscopy. In some cases, a light source projects a sequence of two-dimensional spatial patterns onto a sample using a spatial light modulator. In some cases, the spatial patterns are based on Hadamard matrices. In some cases, an imaging device captures frames of image data in response to light emitted by the sample and orthogonal components of the image data are analyzed by cross-correlating the image data with the spatial pattern associated with each frame. A microscope may be calibrated by illuminating a sample with the sequence of spatial patterns, capturing image data, and storing calibration that maps each pixel of the spatial light modulator to at least one pixel of the imaging device.

6 Claims, 10 Drawing Sheets

Related U.S. Application Data

(60) Provisional application No. 62/450,809, filed on Jan. 26, 2017.

(51) Int. Cl.
   *G02B 21/16* (2006.01)
   *G02B 21/36* (2006.01)
   *G06T 7/00* (2017.01)
   *G06T 7/521* (2017.01)
   *G06T 7/80* (2017.01)

(52) U.S. Cl.
   CPC .......... *G02B 21/365* (2013.01); *G06T 7/521* (2017.01); *G06T 7/80* (2017.01); *G06T 7/97* (2017.01); *G01N 2201/0675* (2013.01); *G01N 2201/127* (2013.01); *G06T 2207/10056* (2013.01)

(58) Field of Classification Search
   CPC .. G01N 2201/127; G02B 21/06; G02B 21/16; G02B 21/36; G02B 21/365; G06T 2207/10056; G06T 7/521; G06T 7/80; G06T 7/97
   See application file for complete search history.

(56) References Cited

U.S. PATENT DOCUMENTS

| | | | |
|---|---|---|---|
| 2004/0218172 A1* | 11/2004 | DeVerse | G01N 21/255 250/559.4 |
| 2008/0100836 A1 | 5/2008 | Hangler | |
| 2011/0006231 A1 | 1/2011 | Betzig et al. | |
| 2013/0181143 A1 | 7/2013 | Betzig et al. | |
| 2013/0188250 A1 | 7/2013 | Yokoi | |
| 2014/0211039 A1* | 7/2014 | Herman | H04N 19/90 348/222.1 |
| 2016/0305883 A1 | 10/2016 | Betzig et al. | |
| 2018/0157022 A1 | 6/2018 | Lytle et al. | |
| 2019/0038766 A1 | 2/2019 | Mohanty et al. | |

OTHER PUBLICATIONS

Invitation to Pay Additional Fees for Application No. PCT/US2018/015517 mailed Mar. 23, 2018.

International Search Report and Written Opinion for Application No. PCT/US2018/015517 mailed May 10, 2018.

International Preliminary Report on Patentability for Application No. PCT/US2018/015517 mailed Aug. 8, 2019.

Studer et al., Compressive fluorescence microscopy for biological and hyperspectral imaging. Proc Natl Acad Sci U S A. Jun. 26, 2012;109(26):E1679-87. doi: 10.1073/pnas.1119511109. Epub Jun. 11, 2012.

PCT/US2018/015517, Mar. 23, 2018, Invitation to Pay Additional Feed.

PCT/US2018/015517, May 10, 2018, International Search Report and Written Opinion.

PCT/US2018/015517, Aug. 8, 2019, International Preliminary Report on Patentability.

* cited by examiner

MICROSCOPE IMAGE CAPTURING METHODS

RELATED APPLICATIONS

This application is a continuation of U.S. patent application Ser. No.: 16/480,953, filed Jul. 25, 2019, entitled "Widefield, High-Speed Optical Sectioning," by Cohen, et al., which is a national stage filing under 35 U.S.C. § 371 of International Patent Application Serial No. PCT/US2018/015517, filed Jan. 26, 2018, entitled "Widefield, High-Speed Optical Sectioning," by Cohen et al., which claims the benefit of U.S. Provisional Patent Application Ser. No. 62/450,809, filed Jan. 26, 2017, entitled "Hadamard Microscopy: Widefield High-Speed Optical Sectioning In Tissue," by Cohen et al., each of which is incorporated herein by reference in its entirety.

FIELD

The present disclosure generally relates to microscopy, such as fluorescence microscopy.

BACKGROUND

Many modern applications in neuroscience, and other areas of biology, utilize fluorescence microscopy, where a fluorescence emitted by molecules within a sample are imaged using a microscope. One example application that utilizes fluorescence microscopy is all-optical neurophysiology (AON)—simultaneous optical stimulation and optical readout of neural activity—which provides a promising approach to mapping neural excitability and synaptic strength across wide regions of brain tissue. When applied in acute brain slices, such tools may be used to create brain-wide maps of excitability or synaptic strength, and to probe the effects of chemical, physical or genetic perturbations thereon.

Wide-field epifluorescence microscopes are a conventional tool used in the field, but lack optical sectioning capabilities and thus produce blurry images of 3D tissues. Many optical sectioning methods are known, allowing fluorescent microscopy of semi-transparent samples. These methods can generally be classified by their computational or physical rejection of scattered light: physical methods (such as two photon, confocal, spinning disk, selective plane illumination), or computational methods (such as linear structured illumination, or HiLo).

Two photon and confocal microscopies provide robust optical sectioning. However as point scanning techniques they encounter upper limits on the number of pixels recorded per second. In a typical two-photon system with an 80 MHz pulsed laser, the maximum pixel-rate is $8 \times 10^7$/s, 5-fold lower than in an sCMOS camera. Typically, in two photon microscopy, one dwells for several laser pulses per pixel, so the pixel-rate is correspondingly reduced. In one-photon confocal microscopy, the scan speed increases, but the illumination intensity must increase proportionally to maintain the per-pixel photon count rate. Eventually non-linear damage processes limit the maximum illumination intensity. These limitations on pixel bandwidth impose fundamental tradeoffs in spatial resolution, temporal resolution and field of view.

Spinning disk confocal microscopy (SDCM) is a multiplex version of point-scanning confocal microscopy. However, commercially available SDCM systems are not compatible with low-magnification, high NA objectives because the SDCM systems lack sufficient etendue, i.e. they cannot accommodate the full range of optical rays transmitted by an objective.

Selective plane illumination microscopy (SPIM) refers to several variations in which the excitation and collection of fluorescence are directed through non-overlapping paths to reduce background fluorescence. The SPIM geometry works best with samples accessible from multiple directions, such as zebrafish, *Drosophila* embryos, or cleared (transparent) whole mouse brains. SPIM is not suited for wide-field imaging of planar or near-planar samples, such as rodent brain in slice or in vivo, due to the requirement for optical access from multiple non-overlapping sets of angles. In an alternative SPIM configuration, orthogonal excitation and collection paths are combined through a single high-magnification microscope objective. This alternative approach divides the numerical aperture into separate components for excitation and illumination, decreasing the spatial resolution and light collection efficiency below the optical specifications of the objective.

Computational methods combine structured illumination with off-line image processing to generate an optical section. In structured illumination microscopy (SIM), for example, stripe patterns are projected in various phases and orientations and then computationally demodulated, however these linear patterns suffer from scattering when projected into thick turbid tissue (>15 um), resulting in artifacts in reconstructed images.

Random illumination patterns have also been used to distinguish in-plane signals from background in tissue samples. In HiLo microscopy, one image under uniform illumination and one image under structured illumination are used to calculate an optical section. The HiLo method is insensitive to the precise pattern used for the structured illumination. In blind-SIM a different algorithm is used, also with randomly illuminated structured images. These methods do not require foreknowledge of the structured illumination pattern, and indeed do not use information on the illumination pattern in the analysis. As a result, they cannot distinguish emitted photons that have scattered from ones that have traveled ballistically. By selecting image components with high spatial frequencies, these methods might spuriously reject large fluorescent structures in the focal plane.

SUMMARY

The present disclosure generally relates to fluorescence microscopy, such as Hadamard microscopy. The subject matter of the present disclosure involves, in some cases, interrelated products, alternative solutions to a particular problem, and/or a plurality of different uses of one or more systems and/or articles.

An example apparatus includes a microscope; a two-dimensional spatial light modulator positioned within an excitation path of the microscope; and a controller configured to control the two-dimensional spatial light modulator to project a sequence of spatial patterns of illumination onto the sample over time.

Implementations of such an apparatus may include one or more of the following features. The two-dimensional spatial light modulator may include a digital micro-mirror array. The two-dimensional spatial light modulator may be positioned to project a spatial pattern of illumination onto a sample. The two-dimensional spatial light modulator may be positioned between a light source of the epifluorescence microscope and a dichroic mirror of the epifluorescence microscope. The spatial pattern may be a binary spatial pattern. The microscope may be an epifluorescence microscope. Each spatial pattern of the sequence of spatial patterns maybe near orthogonal to the other spatial patterns of the sequence of spatial patterns, where a first spatial pattern is near orthogonal to a second spatial pattern if a correlation coefficient between the first spatial pattern and the second spatial pattern is less than or equal to 0.25. Each spatial pattern of the sequence of spatial patterns may be based on a Hadamard matrix. The sequence of spatial patterns may include more than ten spatial patterns.

Implementations of such an apparatus may further include one or more of the following features. The apparatus may include an analyzer configured to analyze image data captured by an imaging device of the microscope. The image data may include multiple frames, each frame associated with a corresponding spatial pattern of the sequence of spatial patterns. The analyzer may be configured to analyze orthogonal components of each frame of the image data. The apparatus may further include a memory configured to store calibration data that maps each pixel of the two-dimensional spatial light modulator to at least one pixel of the imaging device of the microscope. The analyzer may be configured to analyze the image data using the calibration data. The calibration data may be collected during a calibration procedure that is separate from an experimental procedure during which the image data is collected. The calibration data may be collected during an experimental procedure during which the image data is collected without using a separate calibration sample. The microscope may include a dichroic mirror. The dichroic mirror may have an aperture with a diameter greater than 50 mm. The dichroic mirror may be less than 2 mm thick. The dichroic mirror may be less than 2 mm thick. The apparatus may include an optical window positioned between the two-dimensional spatial light modulator and a projection lens. The optical window may be configured to correct an astigmatism of the dichroic mirror. The apparatus may include at least one noncircularly-symmetric lens configured to correct an astigmatism of the dichroic mirror. The at least one noncircularly-symmetric lens may include a cylindrical lens. The dichroic mirror may be greater than 2 mm thick and may be configured to have nominal astigmatism such that the apparatus does not include an optical window configured to correct an astigmatism of the dichroic mirror. A projection lens of the microscope may include a circularly-symmetric lens.

An example of a method includes illuminating, in a microscope, a sample with a sequence of two-dimensional spatial patterns using light of a first wavelength; capturing image data based on light of a second wavelength emitted by the sample in response to being illuminated by the light of the first wavelength, the image data comprising a plurality of frames, wherein each frame of the plurality of frames is associated with a respective two-dimensional spatial pattern of the sequence of two-dimensional spatial patterns; and analyzing, using at least one processor, orthogonal components of each frame of the image data.

Implementations of such a method may include one or more of the following features. The sequence of two-dimensional spatial patterns may be formed using a digital micro-mirror array. Each two-dimensional spatial pattern of the sequence of two-dimensional spatial patterns may be configured such that neighboring locations within the sample are illuminated with orthogonal functions of intensity. Each two-dimensional spatial pattern of the sequence of two-dimensional spatial patterns may be a binary spatial pattern. Each two-dimensional spatial pattern of the sequence of two-dimensional spatial patterns may be near orthogonal to the other two-dimensional spatial patterns of the sequence of two-dimensional spatial patterns, where a first two-dimensional spatial pattern is near orthogonal to a second two-dimensional spatial pattern if a correlation coefficient between the first two-dimensional spatial pattern and the second two-dimensional spatial pattern is less than or equal to 0.25. Each two-dimensional spatial pattern of the sequence of two dimensional spatial patterns may be based on a Hadamard matrix. The sequence of two-dimensional spatial patterns may include more than ten two-dimensional spatial patterns.

Implementations of such a method may further include one or more of the following features. The method may further include analyzing the image data using calibration data that maps each pixel of a two-dimensional spatial light modulator that generates the sequence of two-dimensional spatial patterns to at least one pixel of an imaging device that captures the image data. The calibration data may be collected during a calibration procedure that is separate from an experimental procedure during which the image data is collected. The calibration data may be collected during an experimental procedure during which the image data is collected without using a separate calibration sample.

An example of a device configured to be used with a microscope includes a two-dimensional spatial light modulator positioned within an excitation path of the microscope; and a controller configured to control the two-dimensional spatial light modulator to project a sequence of spatial patterns of illumination onto the sample over time.

Implementations of such a device may include one or more of the following features. The two-dimensional spatial light modulator may include a digital micro-mirror array. The two-dimensional spatial light modulator may be configured to be positioned between a light source of the microscope and a dichroic mirror of the microscope. The spatial pattern may be a binary spatial pattern. The device may further include a controller configured to control the two-dimensional spatial light modulator to project the sequence of spatial patterns of illumination onto the sample over time. Each spatial pattern of the sequence of spatial patterns may be near orthogonal to the other spatial patterns of the sequence of spatial patterns, wherein a first spatial pattern is near orthogonal to a second spatial pattern if a correlation coefficient between the first spatial pattern and the second spatial pattern is less than or equal to 0.25. Each spatial pattern of the sequence of spatial patterns may be based on a Hadamard matrix. The sequence of spatial patterns may include more than ten spatial patterns. The device may further include an analyzer configured to analyze image data captured by an imaging device of the microscope. The image data may include multiple frames, each frame associated with a corresponding spatial pattern of the sequence of spatial patterns, and wherein the analyzer is configured to analyze orthogonal components of each frame of the image data. The device may further include a memory configured to store calibration data that maps each pixel of the two-dimensional spatial light modulator to a pixel of the imaging device of the microscope. The analyzer may be configured to analyze the image data using the calibration data. The calibration data may be collected during a calibration procedure that is separate from an experimental procedure during which the image data is collected. The calibration data may be collected during an experimental procedure during which the image data is collected without using a separate calibration sample.

An example of a method of calibrating a microscope comprising a two-dimensional spatial light modulator positioned within an excitation path of the microscope and an imaging device, the method includes illuminating a sample with a sequence of two-dimensional spatial patterns using light of a first wavelength; capturing image data based on light of a second wavelength emitted by the sample in response to being illuminated by the light of the first wavelength, the image data comprising a plurality of frames, wherein each frame of the plurality of frames is associated with a respective two-dimensional spatial pattern of the sequence of two-dimensional spatial patterns; and storing calibration data that maps each pixel of the two-dimensional spatial light modulator to at least one pixel of an imaging device that captures the image data.

Implementations of such a method may include one or more of the following features. The sample may be a uniform fluorescent sample. The sample may be a biological sample to be imaged by the microscope. The microscope may be an epifluorescence microscope.

An example of an imaging system for optical sectioning includes an imaging device configured to capture image data associated with a sample under a plurality of illumination conditions, wherein the image data comprises multiple frames; and at least one processor configured to receive the image data and determine an optical section of the sample by correlating each frame of the image data with a respective illumination condition of the plurality of illumination conditions.

Implementations of such a method may include one or more of the following features. The at least one processor may be configured to correlate each frame of the image data with a respective illumination condition by cross-correlating each frame with a respective matrix of a plurality of matrices, wherein each matrix of the plurality of matrices is near orthogonal to each of the other matrices of the plurality of matrices, wherein a first matrix is near orthogonal to a second matrix if a correlation coefficient between the first matrix and the second matrix is less than or equal to 0.25. Each of the plurality of matrices may be based on a Hadamard matrix. The at least one processor may be further configured to determine the optical section of the sample using calibration data. The at least one processor may be configured to filter the image data using a computational pinhole filter based on the calibration data.

Other advantages and novel features will become apparent from the following detailed description of various non-limiting embodiments of the invention when considered in conjunction with the accompanying figures.

BRIEF DESCRIPTION OF THE DRAWINGS

Non-limiting embodiments will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the invention.

In the figures.

DETAILED DESCRIPTION

Figure 1:
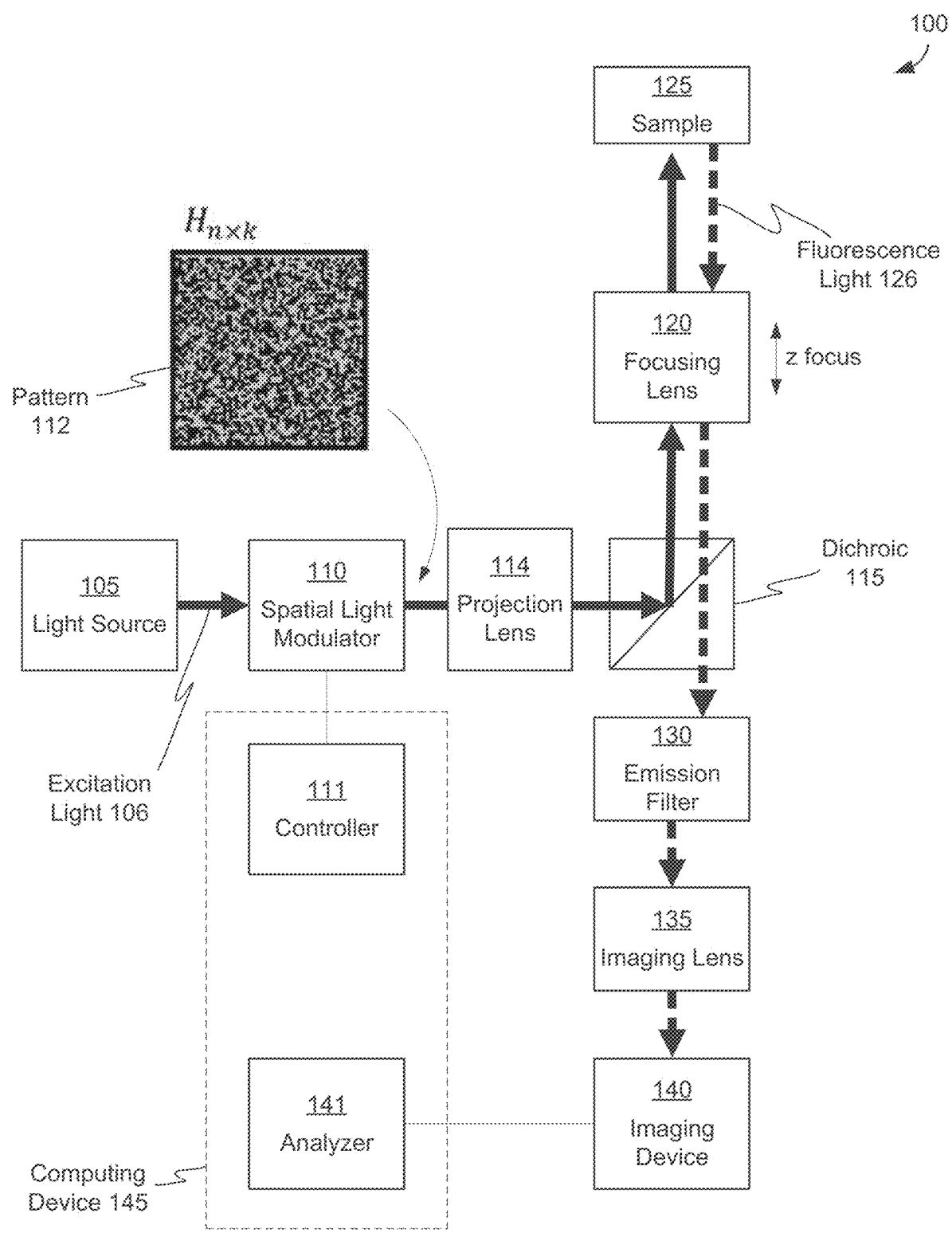
FIG. 1 is an example epifluorescence microscope, according to some embodiments.

The microscopy techniques discussed herein, referred to in some embodiments as Hadamard Microscopy, addresses the deficiencies of conventional microscopy techniques by illuminating the sample with precisely defined optical patterns, and then using knowledge of the illumination pattern in a computational method to separate in-focus fluorescence from out-of-focus and scattered light. In particular, Hadamard microscopy may be used to encode image information into a deterministic arrangement of uniform spectral density patterns that is robust to scattering and can be optimally decoded by matched filtering with the designed codes. The inventors have recognized and appreciated that the scattering problems that arise in microscopy may be overcome using Hadamard-Walsh coding, which uses pseudo-random binary sequences to encode excitation light used in fluorescence microscopy.

The inventors have recognized and appreciated that certain conventional components are sufficient to perform imaging in tissues, but the lack of suitable optical sectioning techniques impairs higher resolution imaging, e.g., single-cell resolution. For example, commercially available objective lenses (e.g., Olympus MVPLAPO 2XC) provide low magnification (2×), diffraction-limited imaging, and high light-collection efficiency (numerical aperture, NA 0.5) over a large field of view, and modern scientific CMOS cameras acquire images at 2048×2048 resolution, at up to 100 frames/s, corresponding to ~4×108 pixels/s. With a 6.5 micrometer pixel pitch in the camera plane, an sCMOS camera paired with a 2× objective can probe a field of view 6 mm×6 mm, with 3.25 micrometer spatial resolution at 100 frames/s. To achieve optical sectioning in 3D samples, the inventors have recognized and appreciated that at least two physically distinct processes should be accounted for. First, out-of-focus fluorescence light leads to a background haze, even in samples that are refractively homogeneous. Second, light scattering off refractive inhomogeneities degrades the point-spread function, preventing formation of a diffraction-limited excitation focus within the sample, and for a fluorescent point-source within the sample, preventing formation of a diffraction-limited image in the image plane.

As mentioned above, a challenge in optical microscopy is to image a selected plane in a three-dimensional sample, while rejecting background fluorescence and scattered light. Point-scanning techniques are too slow to image large areas with simultaneously high resolution in space and time, while conventional structured illumination techniques suffer image distortions in samples with refractive inhomogeneities. Some aspects of the present disclosure are generally directed to performing optical sectioning in complex samples that achieves simultaneously high spatial and high temporal resolutions over a large field of view. In some embodiments, some or all of the pixels in the object plane are illuminated with a binary Hadamard sequence, orthogonal in time to the sequences of nearby pixels. Wide-field fluorescence images are recorded on an imaging device, such as a CCD camera. A reconstruction algorithm analyzes the image data to separate focal-plane fluorescence from out-of-focus background and light scattering. The Hadamard coding matrix can be used to illuminate the sample with a substantially uniform spectral density in space and in time, eliminating aliasing artifacts that can contaminate other structured illumination microscopies.

In some embodiments, a spatial light modulator, such as a digital micromirror device (DMD) may be placed in an excitation path of an epifluorescence microscope to project a spatial pattern of illumination on the sample being imaged. In some embodiments, the spatial pattern is generated such that adjacent sample locations are illuminated with temporally orthogonal pseudo-random Hadamard codes. In some embodiments, optical sections may be obtained from resulting image data by demodulating a corresponding frame of image data associated with a particular spatial pattern.

In some embodiments, a sequence of spatial patterns are projected onto the sample over time. In some embodiments, each spatial pattern of the sequence may be orthogonal to the other spatial patterns. For example, the spatial patterns may be determined using Hadamard matrices. In some embodiments, the spatial patterns of the sequence may be orthogonal or near orthogonal. Two spatial patterns are said to be "near orthogonal" when a correlation coefficient between the two spatial patterns is less than or equal to 0.25. In some embodiments, even when the spatial patterns are not orthogonal, some of the same benefits of using orthogonal spatial patterns may be achieved by analyzing orthogonal components of the image data.

Referring to the example shown in FIG. 1, an epifluorescence microscope 100 according to some embodiments includes a light source 105, a dichroic mirror 115, a focusing lens 120, an emission filter 130, an imaging lens 135 and an imaging device 140. Some embodiments are directed to a device comprising a spatial light modulator and controller 111 that may be retrofitted to an existing epifluorescence microscope 100. Other embodiments are directed to the entire apparatus, including the epifluorescence microscope 100 and the spatial light modulator 110 and the controller 111. In some embodiments, the epifluorescence microscope 100 may be configured similarly to a conventional widefield epifluorescence microscope.

The light source 105 emits excitation light 106 that is configured to cause at least one type of molecule within the sample 125 to emit fluorescence light 126. The excitation light follows an excitation path to the sample 125. The excitation path may include the dichroic mirror 115, which reflects the excitation light 106 towards the sample 125, and the focusing lens 120, which focuses the excitation light 106 onto the sample 125.

The light source 105 may be, by way of example and not limitation, a light emitting diode or a laser. For example, a 100 mW Cobolt Jive 0561-04-01-0100-500 laser may be used to emit excitation light 106 at 561 nm or a 100 mW Coherent Obis 1226419 may be used to emit excitation light 105 at 488 nm. In some embodiments, more than one wavelength of light may be used simultaneously. For example, a first laser may emit excitation light at 470 nm and a second laser may emit excitation light at 561 nm. The light of different wavelengths may be combined and directed toward the spatial light modulator 110. In some embodiments, an excitation filter may be used to filter the excitation light 106 to a wavelength best suited for the molecules being imaged in the sample 125.

A spatial light modulator 110 is positioned within the excitation path to modulate the excitation light 106 such that a pattern 112 is projected onto the sample 125. The spatial light modulator 110 may be, for example, located between the light source 105 and the dichroic mirror 115. In some embodiments, the spatial light modulator 110 comprises a digital micromirror device (DMD). The DMD is an array of tilting mirrors that can be individually addressed to direct light into or away from the optical path. Each pixel of the DMD is imaged onto a corresponding location in a sample plane. In some embodiments, the DMD may have on its surface several hundred thousand microscopic mirrors arranged in a rectangular or other regular array. For example, the DMD may have an array of 1024×768 pixels. By modulating the pattern on the DMD, one can project an arbitrary or user-defined binary spatial pattern of illumination onto the sample. DMDs may be obtained commercially. It should be understood, however, that another device able to project arbitrary spatial patterns of illumination may be used instead of or in addition to a DMD, in other embodiments. For example, a liquid crystal and a polarizer may be placed in the excitation path to form the pattern. Alternatively, the light source 105 itself may be an array of LEDs that produces spatial patterns without the need for a separate spatial light modulator.

The spatial light modulator 110 is controlled, by a controller 111, to generate the pattern 112 at any given time. Light scattered within the sample may be rejected by projecting a sequences of two-dimensional patterns such that neighboring locations of the sample are illuminated with orthogonal functions of intensity vs. time. A Hadamard matrix, H, of size m is a binary square matrix with elements $\{-1,1\}$ that fulfills $H^TH=mI_m$, where $I_m$ is the identity matrix of size m; its normalized form has value 1 in the first column and first row. Illumination intensities may not be negative, so the projected intensity patterns are given by $P=(H'+1)/2$ where $H'=H[1, \ldots ,m;m+n+1, \ldots ,m]$ is a submatrix that is an incomplete orthogonal basis given by the last n columns of a normalized Hadamard matrix, with n<m. The illumination patterns P thus had binary values $\{0,1\}$ corresponding to DMD mirror positions OFF and ON, respectively. In some embodiments, each location may be illuminated with a positive temporal function orthogonal to the other designed Hadamard sequences, as verified by $PTH'=I_n*m/2$. In some examples, for a given number of locations, a Hadamard matrix provides a set of binary orthogonal functions. In some embodiments, the set is the shortest possible set. To arrange the n codes in P into illumination patterns, m=n+1 images were defined assigning code $k_{i,j} \in \{1 \ldots n\}$ to DMD pixel (i,j), as $k_{i,j}=\mod(i*q+j,n)+1$, where q was an offset parameter that maximized spatial separation of repeated codes. (n,q) was set to (11,3) for functional imaging, and to (63,14) or (59,8) for structural imaging. To further reduce spurious scattering cross-talk, a random binary mask R was generated to flip the sign of 50% of DMD pixels, applied as an exclusive OR operation on all DMD patterns against the same mask R.

In some embodiments, the spatial pattern is generated by tiling a Hadamard matrix to fill the pixels of the spatial light modulator 110. In some embodiments, the number of elements in the Hadamard matrix determines the number of patterns in the sequence. Thus, a Hadamard matrix smaller than the total number of pixels of the spatial light modulator 110 may be used resulting in a sequence with non-orthogonal patterns. However, the patterns in the sequence may be near orthogonal and the negative effects of any non-orthogonality can be reduced by the fact that only nearby portions of the sample will scatter light that affects the quality of the image, and the portions of the sample near any particular point are likely to be illuminated by an orthogonal sequence.

The focusing lens 120 may adjust the sample plane being imaged by being translated along the z direction within the excitation path. In some embodiments, the focusing lens 120 is an objective lens. In some embodiments, a sequence of two-dimensional patterns are projected on the sample for each of a plurality of sample planes such that the tissue is optically sectioned.

The sample 125 includes reporter tags that emit fluorescence light 126 in response to being illuminated by excitation light 106. Nonlimiting examples of reporter tags include channelrhodopsin and red-shifted genetically encoded $Ca^{2+}$ indicator (RGECI). In some embodiments, more than one reporter tag may be used simultaneously such that multiple proteins may be imaged at the same time. In some embodiments, a first reporter tag may be excited by excitation light of a first wavelength and emit fluorescence light at a second wavelength; and a second reporter tag may be excited by excitation light of a third wavelength and emit fluorescence light at a fourth wavelength, where the first through fourth wavelength are all different.

The fluorescence light 126 follows a fluorescence path to the imaging device 140, the fluorescence path including the focusing lens 120, transmission through the dichroic mirror 115, transmission through emission filter 130, and transmission through the imaging lens 135.

The dichroic mirror 115 is configured, in some embodiments, to reflect excitation light 106 and transmit fluorescence light 126, making the excitation path different from the fluorescence path. While not shown in FIG. 1, some of the excitation light 106 will reflect off the sample 125 and be directed back towards the dichroic mirror 115. This reflected excitation light 106 is then reflected away from the fluorescent path by the dichroic mirror 115. The reflected excitation light and/or other sources of background light may further be removed from the fluorescence path by an emission filter 130 that is configured to transmit light with a wavelength equal to the wavelength of the fluorescence light 126.

The imaging lens 135 focuses the fluorescence light 126 onto the imaging device 140. In some embodiments, the imaging lens 135 is a spherical lens. In some embodiments, the imaging device 140 may be a camera comprising an array of pixels configured to detect the fluorescence light 126. The imaging device 140 may be, for example, a CCD camera or a CMOS camera. The imaging device outputs image data, which may include a plurality of frames, each frame corresponding to the detected fluorescence light 126 at a particular time.

An analyzer 141 in FIG. 1 is configured to analyze the image data from the imaging device 140. In some embodiments, the analyzer 141 and the controller 111 are separate computing devices. In other embodiments, the analyzer 141 and the controller 111 are implemented using a single computing device 145. The analyzer 141 may include circuitry such as processor configured to analyze the image data received from the imaging device 140.

As a non-limiting example of the epifluorescence microscope 100, a 5×5 $mm^2$ area of the sample 125 may be imaged to a 2048×2048 $pixels^2$ camera detector (Hamamatsu Orca Flash 4) using a 50 mm objective lens (Olympus MVPLAPO 2XC) as the focusing lens 120 and a 135 mm imaging tube lens (Zeiss Apo-Sonnar 135 mm) as the projection lens 114. The controller 111 generates patterns that are imposed onto 460 nm LED illumination by reflecting off a spatial light modulatore 110 that comprises a digital micromirror device (DMD) module (Vialux V-7001 with star core optics), comprising an array of 1024×768 pixels, 13.7 micrometer pitch. The excitation light 106 modulated by the pattern 112 is transmitted by a 100 mm projection tube lens (Zeiss Makro-Planar 100 mm) as the projection lens 114, reflected off a large area dichroic mirror 115 (Semrock Di01-R405/488/561/635-t3-60×85) and focused onto the sample by the objective lens 120. With this configuration, the sample magnifications into the camera and into the DMD are 2.7× and 1.5× respectively.

Additional elements may be included in the optical design to correct for certain aberrations. By using aberration-free projection, implementation of a Hadamard microscope such as described above may be achieved. Aberrations are not a concern for conventional epifluorescence microscopy because, in conventional approaches, the excitation light 106 is uniform and aberration do not affect the overall image quality. However, when particular spatial patterns are used to illuminate the sample 125, aberrations in the excitation light path may need to be reduced in certain embodiments.

For example, a Hadamard Microscope may suffer from aberrations introduced upon reflection of the high-étendue structured illumination off of the dichroic mirror. Due to their manufacturing process, thin dichroic mirrors (less than 2 mm thick) may be warped. This warping introduces aberrations, predominantly astigmatism, in reflected light. Dichroic warping is less of a problem in microscopes with conventional objectives, where the dichroic mirror is typically smaller (25×36 mm). In the ultrawide-field configuration the dichroic mirror was 60×85 mm, so warping introduced significant wavefront aberration, degrading the sharpness of the projected patterns.

In some embodiments, the warping of the dichroic mirror 115 may be addressed by introducing a rotated optical flat window (not shown) into the diverging path of light between the spatial light modulator 110 and the projection lens 114. This window can be centered in the optical path, but rotated so that its normal was not parallel with the optical path. The window introduced an astigmatism into the beam, whose magnitude depended on the rotation angle. By adjusting the rotation angle, one could introduce astigmatism of equal magnitude but opposite sign to that of the dichroic 115, thereby cancelling the aberration.

In addition, other systems for introducing astigmatism, such as noncircularly-symmetric lenses, may be used. For instance, in some embodiments, the projection lens 114 may be replaced by one, or two or more separate cylindrical lenses of the same focal length, but located at different, independently adjustable distances along the optical path. This arrangement also may allow cancellation of the astigmatism introduced by the dichroic.

In some embodiments, as shown in FIG. 1, a modified dichroic mirror may be used. For instance, thicker dichroic mirrors, which may be flatter than standard dichroic mirrors may be used. As an example, as shown in FIG. 1, a custom 3 mm thick dichroic mirror was used, which was flatter than the standard 1.1 mm thick dichroic mirrors.

Figure 2:
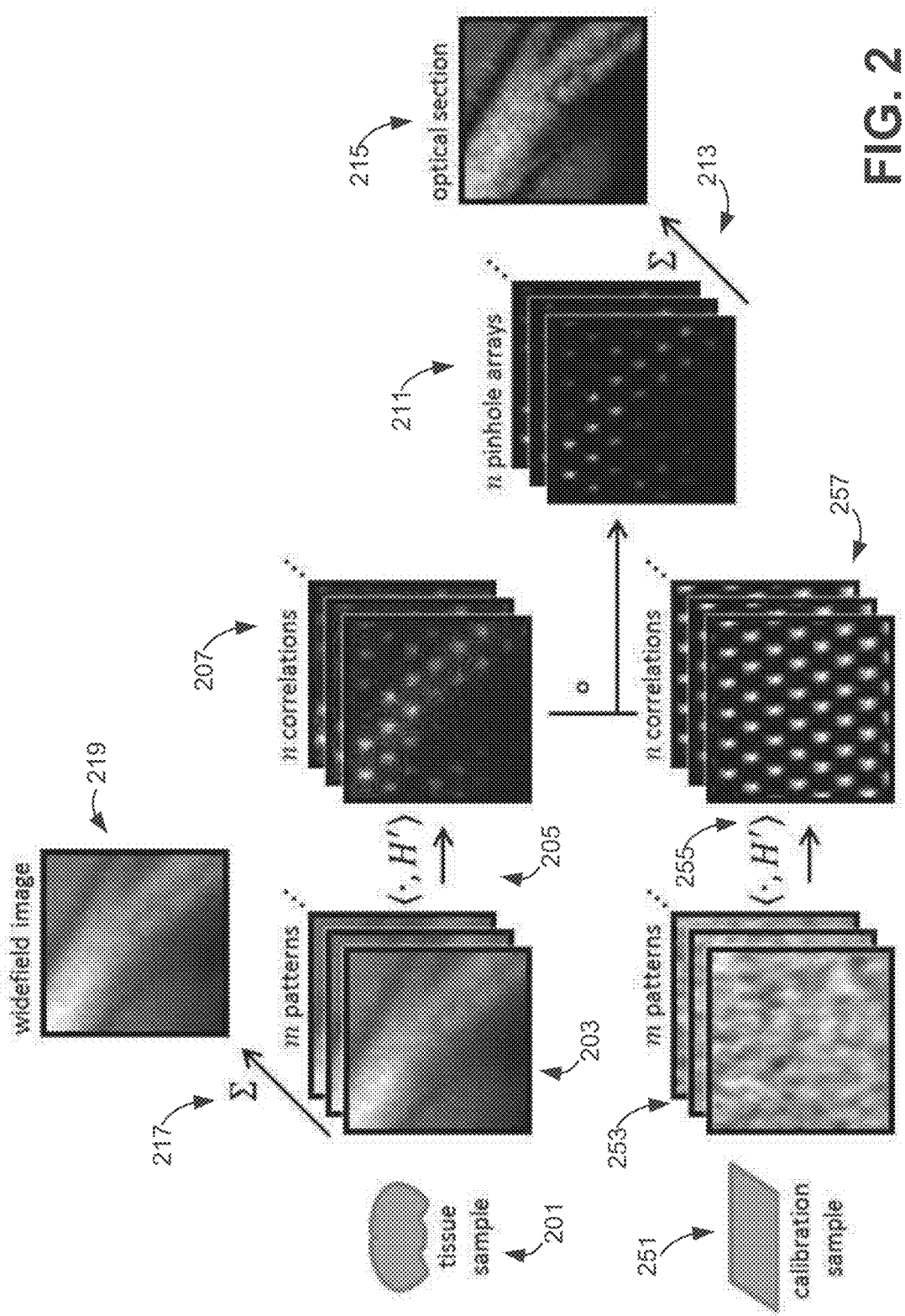
FIG. 2 is an schematic diagram of a Hadamard microscopy technique, according to some embodiments.

Referring to FIG. 2, a schematic diagram of how Hadamard microscopy is performed, according to some embodiments, includes a number of steps. A Hadamard image is computed from a series of wide-field epifluorescence images 203 of a tissue sample 201, each acquired under illumination with a unique binary pattern, which in the example illustrated include m different patterns. This process can be repeated at multiple z positions to generate a 3D Hadamard image (z-stack), and/or at multiple time points to generate a movie. For example, the process may be repeated to generate at least 2, at least 3, at least 5, at least 10, at least 30, at least 50, at least 100, at least 300, at least 500, at least 1,000, at least 3,000, at least 5,000, at least 10,000, at least 30,000, at least 50,000, at least 100,000, at least 300,000, at least 500,000, or at least 1,000,000 images, e.g., in a z-stack and/or at different times, e.g., to produce a movie.

In some embodiments, a calibration sample 251 is used to calibrate the Hadamard microscope in advance. The calibration is used to create calibration data that maps the pixels of the spatial light modulator 110 to the pixels of the imaging device 140. In some embodiments, a single pixel of the spatial light modulator 110 may map to more than one pixel of the imaging device 140. In some embodiments, every pixel of the imaging device 140 maps to one and only one pixel of the spatial light modulator 110. In some embodiments, the calibration sample 251 may include a thin material (to reduce scattering) that has reporter tags uniformly distributed throughout. A calibration data-set C can be obtained by illuminating the calibration sample 251 with the Hadamard patterns and recording an image of each pattern. For each camera pixel, the time series of its photon counts is cross-correlated against each Hadamard sequence as $C^TH'$. The resulting cross-correlation images may contain the precise mapping of each DMD pixel onto the coordinates of the camera pixels. Each cross-correlation image resembles the image that would have been obtained had the corresponding set of DMD pixels been turned on. The cross-correlation images also allow corrections for inhomogeneities in the illumination profile. In other embodiments, the calibration sample 251 is the same as the tissue sample, and no separate calibration step is needed. The calibration procedure includes acquiring a set of calibration images 253 from the same sequence of unique binary patterns that is used to acquire the wide-field epifluorescence images 203.

Cross-correlation images 207 are generated for each wide-field epifluorescence image 203 by cross-correlating 205 each wide-field epifluorescence image 203 with its associated pattern. Similarly, cross-correlated calibration images 257 are generated for each calibration image 253 by cross-correlating 255 each wide-field epifluorescence image 253 with its associated pattern. The cross-correlation images 207 show a set of peaks modulated by the local reporter tag density, and broadened by off-focus fluorescence and light scattering in the sample. Each peak characterizes the scattering function of the corresponding tissue location.

In some embodiments, a set of computational "pinholes" is used to select the unscattered in-focus light and reject other light. The computational pinholes are a spatial filter that may be implemented through the element-wise product of the cross-correlation images 207 with each respective cross-correlated calibration images 257, resulting in a set of positive filtered maps $F=C^TH' \circ D^TH'$. This computational process is similar to sifting emitted light through an array of pinholes as happens physically in SDCM. In some embodiments, a computation step to aggregate the unscattered light by performing a direct sum 213 of the images over all pinhole locations, defining an optical section image 215 $s_i=\Sigma_{k=1}^m F_{i,k}$ is performed. The resulting optical section image 215 may preserve unscattered light emitted from the focal plane, while rejecting scattered light and background emissions. In some embodiments, a standard wide-field epifluorescence image 219 by computing a direct sum 217 of all frames in the raw images, $w_i=\Sigma_{k=1}^m D_{i,k}$.

In some embodiments, the number of locations that can be illuminated with mutually orthogonal time series is bounded by the pattern sequence length. Light modulation and recording typically devices have $\gtrsim 10^6$ pixels. To have all pixels mutually orthogonal would require illumination sequences of $\gtrsim 10^6$ frames, which may be prohibitively slow. However, the intensity of scattered light decays rapidly with distance from a focal illumination spot, so it is not necessary to use mutually orthogonal illumination patterns throughout an entire sample. Rather, in some embodiments, one can reuse illumination patterns at points that are separated by more than the width of the scattering function. This may allow the use of relatively short Hadamard patterns, often only ~10 frames long.

In some cases, light that scatters over distances larger than the tiling period may produce cross-talk in adjacent tiles. In some embodiments, this may be addressed through a further refinement of the illumination patterns and analysis algorithm. Hadamard illumination patterns can be randomly complemented in each location as P=(RH'+1)/2, using a time-invariant pseudorandom diagonal matrix R= diag($r_1, \ldots, r_n$) with $r_i \in \{-1, 1\}$ under equal probability. This approach decreases the effect of crosstalk from long-range scattering, because scattered photons enter with random sign in the correlation images. Scattered photons come from many locations, so on average their effects cancel. This strategy preserves the orthogonality of the illumination functions for neighboring locations. If the same random sign changes are used in the calibration image and the data image, then their effects cancel out in the calculation of F=$C^T$H'∘$D^T$H' because R∘R=I.

Figure 3:
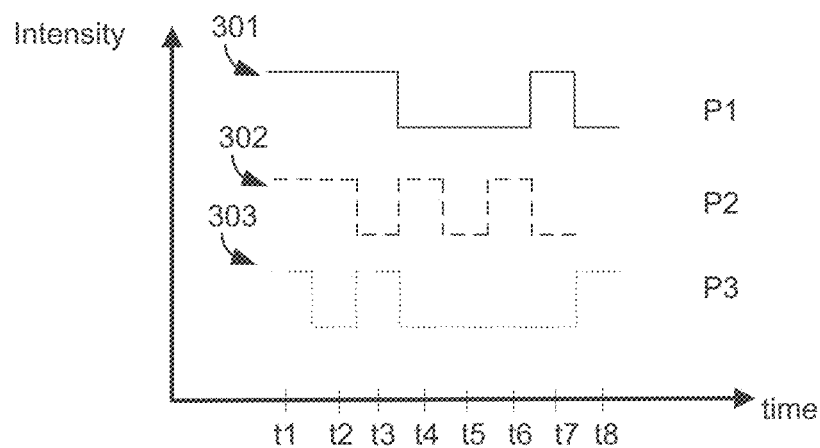
FIG. 3 is a plot of example Hadamard sequences for three adjacent pixels of a spatial light modulator, according to some embodiments.

Referring to FIG. 3, the sequences 301-303 for three adjacent pixels P1-P3 of the spatial light modulator 110 are shown. In some embodiments, the sequences 301-303 are orthogonal functions. In other embodiments, the sequences 301-303 are near orthogonal functions, such that a correlation coefficient between the sequences is less than or equal to 0.25.

Figure 4:
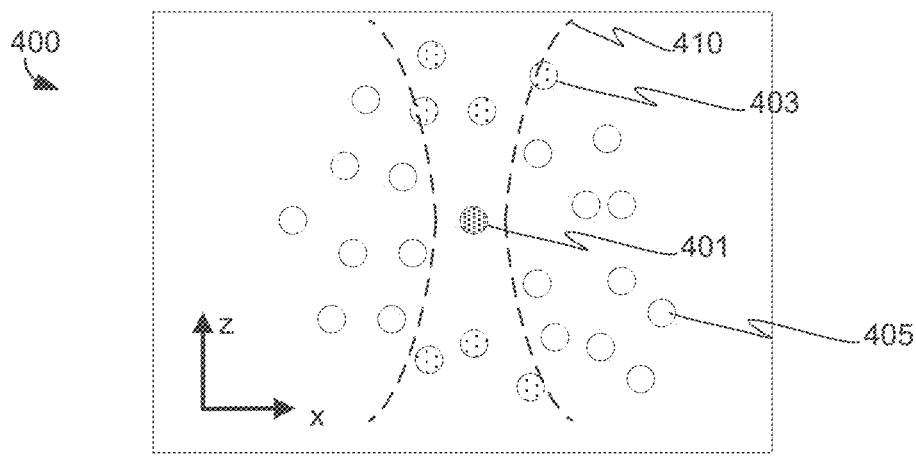
FIG. 4 is a cross-section view of a sample being illuminated by excitation light, according to some embodiments.

FIG. 4, is an x-z cross-section view 400 of the sample showing a plurality of reporter tags being illuminated by excitation light 410, which is a focused. The reporter tag 401 is in-focus; the reporter tags 403 are out-of-focus, but illuminated by the excitation light 410; and reporter tags 405 are not illuminated by the excitation light. The out-of-focus reporter tags 403 reduce the quality of conventional epifluorescence microscopes.

Figure 5:
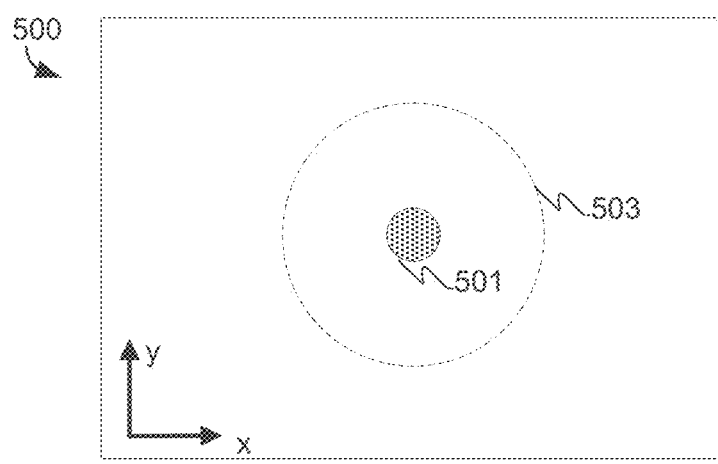
FIG. 5 is raw image data from an imaging device, according to some embodiments.

FIG. 5 is example raw image data 500 from the imaging device 140 recorded while illuminating the reporter tags shown in FIG. 4. Fluorescence light from the in-focus reporter tag 401 creates a well-formed spot 501 in the image data 500. The spot 501 is enlarged due to scattering of the fluorescence light within the sample 125. Fluorescence light from the out-of-focus reporter tags 403 creates a lower intensity spot 503 in the image data 500. The spot 501 is larger than the spot 501 because the reporter tags 403 are not in focus.

Figure 8:
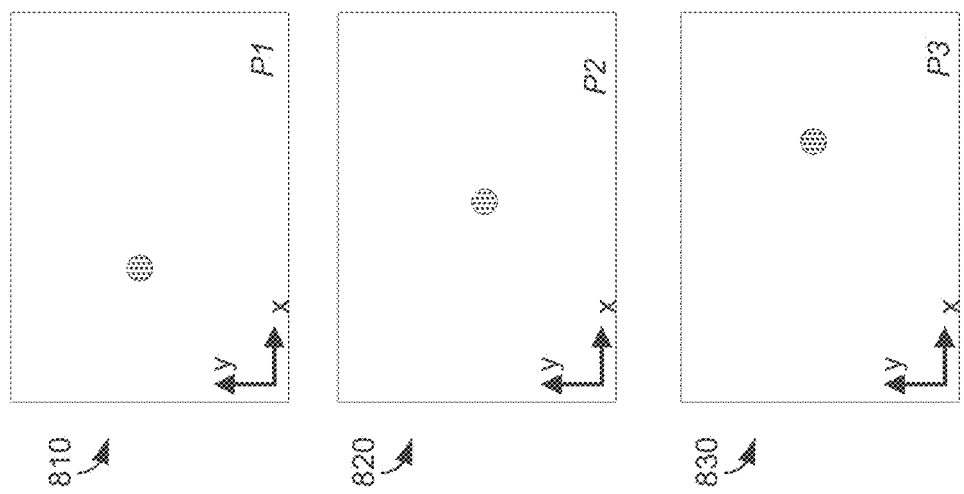
FIG. 8 is filtered image data associated with three adjacent pixels of a spatial light modulator, according to some embodiments.
Figure 7:
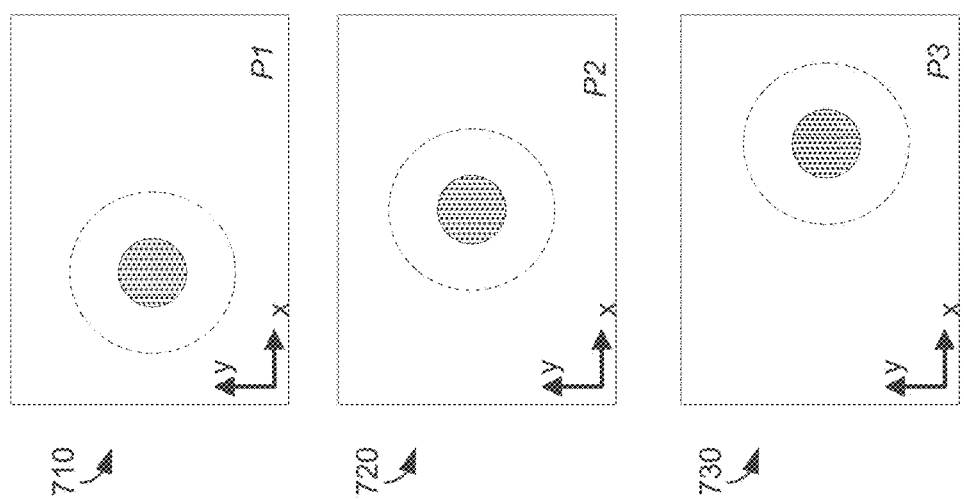
FIG. 7 is cross-correlated image data associated with three adjacent pixels of a spatial light modulator, according to some embodiments.
Figure 6:
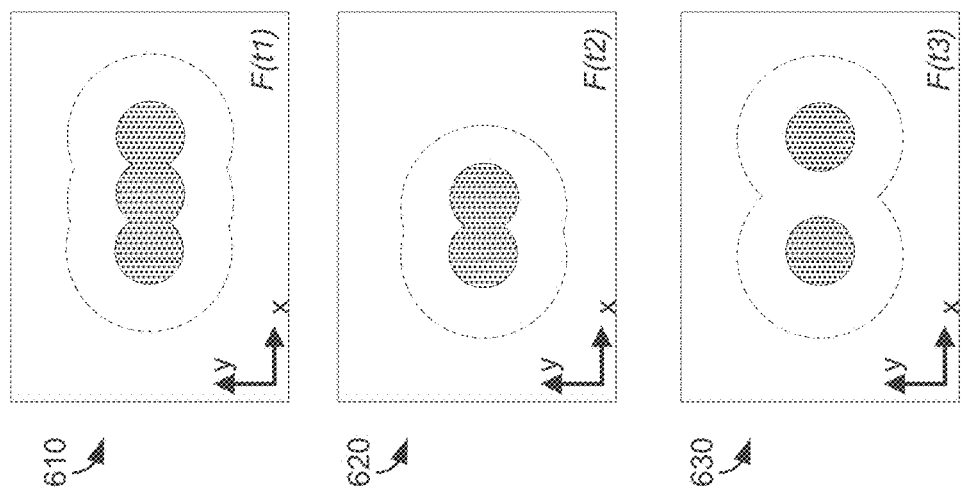
FIG. 6 is raw image data associated with three different illumination patterns, according to some embodiments.
Figure 9:
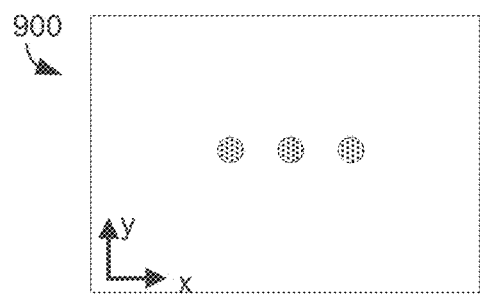
FIG. 9 is a final Hadamard image after summing the filtered image data, according to some embodiments.

FIG. 6 illustrates raw data 610/620/630, which are part of a series of raw images (F(t1), F(t2), . . . , F(tm) acquired with for each illumination pattern. The raw data 610/620/630 are then demodulated to yield images 710/720/730 associated with each pattern P1, P2, and P3, as shown in FIG. 7. Software binary masks then rejected scattered light to acquire filtered images 810/820/830 associated with each pattern, as shown in FIG. 8. The binary masks may be formed based on calibration data. FIG. 9 illustrates the sum of images 810/820/830 results in a final Hadamard image 900 over all illumination locations yielded an optical section.

Figure 10A:
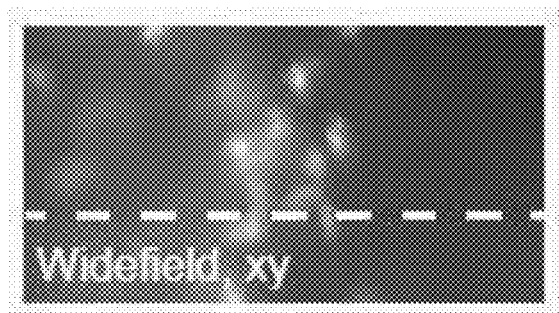
FIG. 10A is an x-y plane image formed using widefield microscopy.
Figure 10D:
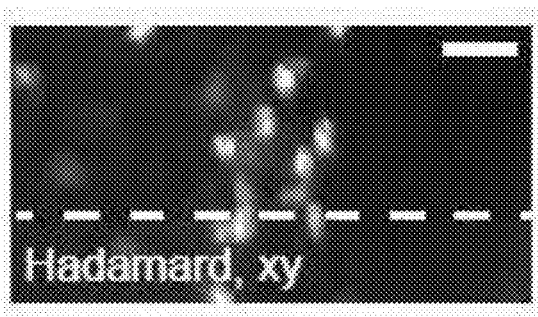
FIG. 10D is an x-z plane image formed using Hadamard microscopy, according to some embodiments.
Figure 10B:
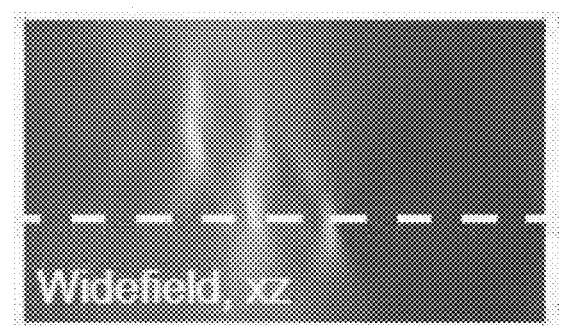
FIG. 10B is an x-y plane image formed using Hadamard microscopy, according to some embodiments.
Figure 10E:
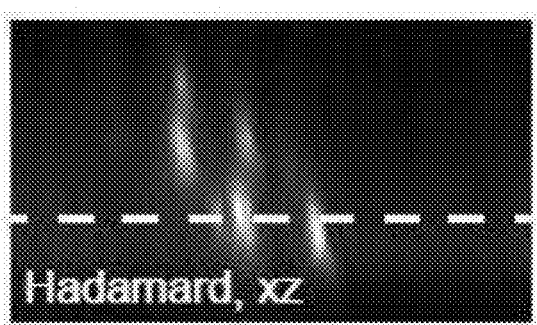
FIG. 10E is an intensity profile for the dashed line shown in FIG. 10A.
Figure 10C:
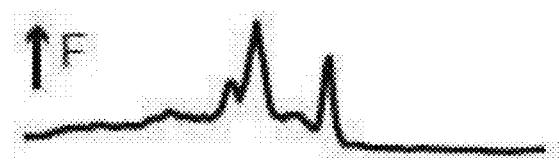
FIG. 10C is an x-z plane image formed using widefield microscopy.
Figure 10F:
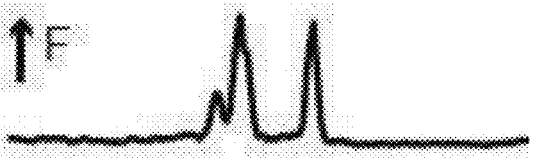
FIG. 10F is an intensity profile for the dashed line shown in FIG. 10B.

FIG. 10A-F compare conventional widefield images 10A-B and Hadamard images FIG. 10D-E in a fixed brain slice expressing membrane-targeted mCitrine, illustrating Hadamard background rejection and an improved point-spread function. The scale bars represent 50 μm. Intensity profiles shown in FIG. 10C and FIG. 10F are from the dotted line in FIGS. 10A and 10D, respectively. As can be seen from FIG. 10A-F, the Hadamard images result in clearer, images that reject scattered light present in the widefield images.

Figure 11:
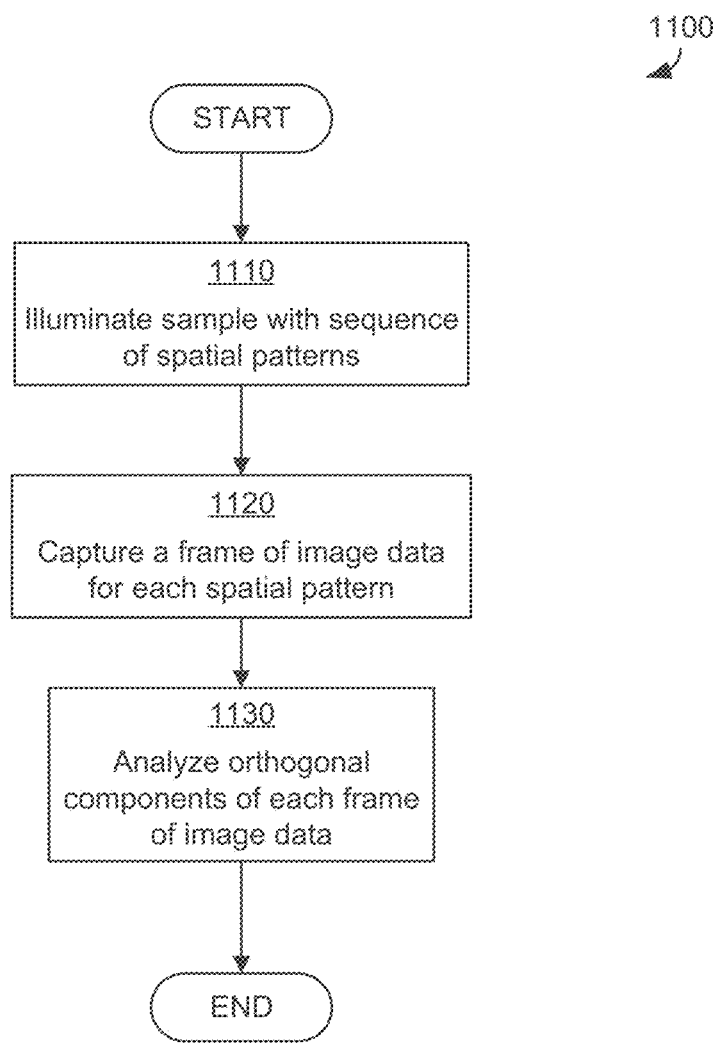
FIG. 11 is a flow chart of a method of Hadamard microscopy, according to some embodiments.

FIG. 11 is a flowchart 1100 of a method of Hadamard microscopy, according to some embodiments. At act 1110, a sample is illuminated with a sequence of spatial patterns, as described above. In some embodiments, the spatial pattern is generated by a spatial light modulator in the excitation light path and is controlled by a controller. At act 1120, a frame of image data is captured for each spatial pattern of the sequence of spatial patterns. In some embodiments, the image data is captured using an imaging device comprising an array of pixels, such as a CCD camera or a CMOS camera. At act 1130, the orthogonal components of each frame of image data are analyzed. In some embodiments, this is performed by an analyzer, such as a computer processor using the techniques described above.

Figure 12:
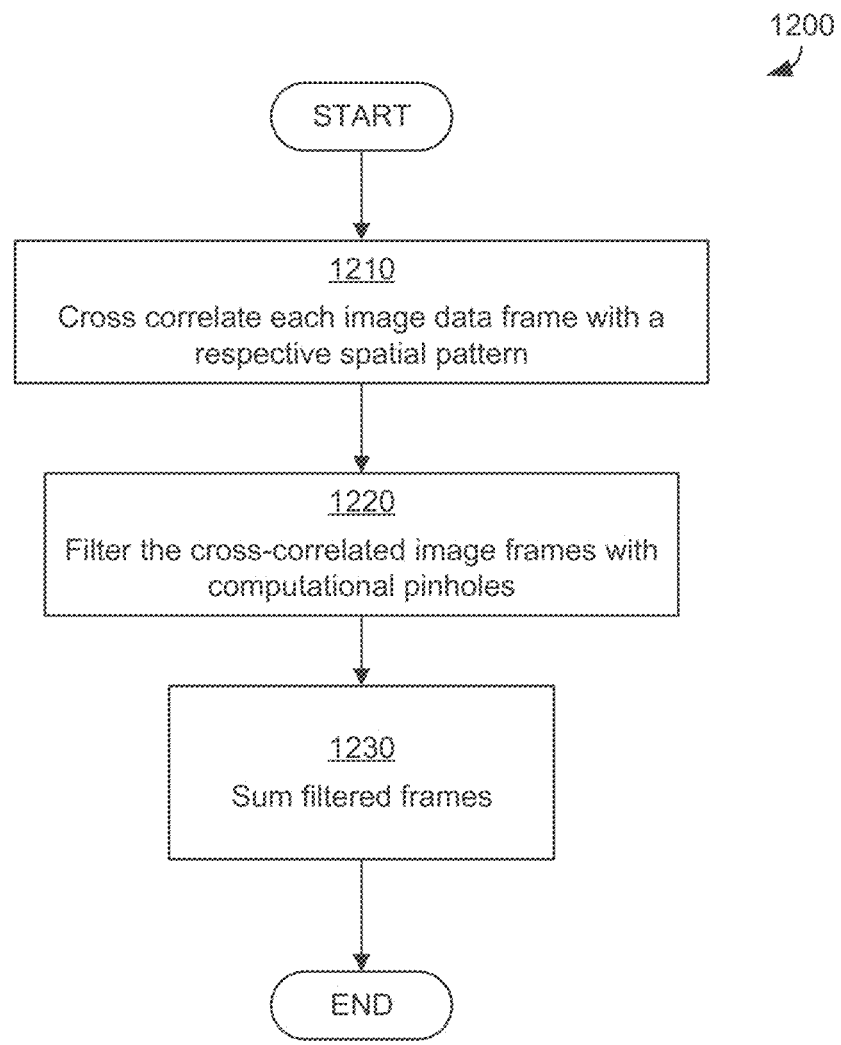
FIG. 12 is a flow chart of a method of analyzing image data, according to some embodiments.

FIG. 12 is a flowchart 1200 of a method of analyzing image data in Hadamard microscopy, according to some embodiments. At act 1210, each frame of image data is cross-correlated with a respective spatial pattern, as described above. At act 1220, each cross-correlated image frame is filtered using a computational pinhole. In some embodiments, the computational pinholes are obtained using calibration data associated with each spatial pattern, as described above. At act 1230, the filtered image frames are summed together to form a Hadamard image.

Figure 13:
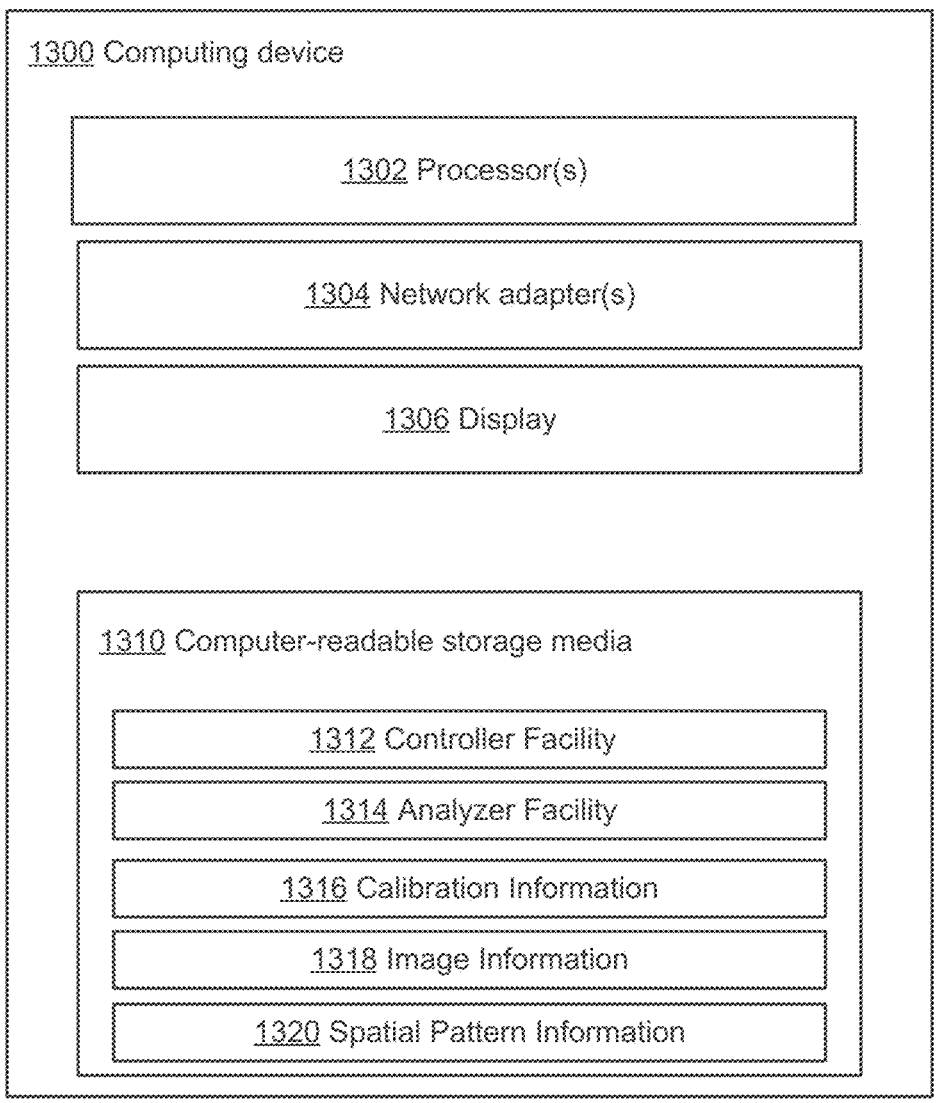
FIG. 13 is a computing device, according to some embodiments.

FIG. 13 illustrates one example implementation of an analyzer 141 and/or a controller 111 in the form of a computing device 1300 that may be used in a system implementing techniques described herein, although others are possible. It should be appreciated that FIG. 13 is intended neither to be a depiction of necessary components for a computing device to operate as an analyzer 141 and/or a controller 111 or any other computing device of a system operating according to techniques described herein, nor a comprehensive depiction.

Computing device 1300 may comprise at least one processor 1302, a network adapter 1304, a display 1306, and computer-readable storage media 1312. Computing device 1300 may be, for example, a desktop or laptop personal computer, a personal digital assistant (PDA), a smart mobile phone, a tablet computer, a server, or any other suitable computing device. Network adapter 1304 may be any suitable hardware and/or software to enable the computing device 1300 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. The display 1306 may be any suitable display for displaying to a user a visual representation of the image data. For example, the display 1306 may be a computer monitor, a LCD display, or a touchscreen display.

The computer-readable media 1310 may be adapted to store data to be processed and/or instructions to be executed by processor 602. Processor 1302 enables processing of data and execution of instructions. The data and instructions may be stored on the computer-readable storage media 1310 and may, for example, enable communication between components of the computing device 1300.

The data and instructions stored on computer-readable storage media 1310 may comprise computer-executable instructions implementing techniques which operate according to the principles described herein. In the example of FIG.

13, computer-readable storage media 1310 stores computer-executable instructions implementing various facilities and storing various information as described above. Computer-readable storage media 1310 may store a controller facility 1312, which may implement any of the techniques described above for controlling the spatial light modulator. The media 1310 may further store an analyzer facility 1314, which may implement any of the techniques described above for analyzing the image data, including the method of FIG. 12. The media 1310 may additionally store calibration information 1316, which may include calibration images and/or cross correlated calibration images. The media 1310 may additionally image information 1318, which may include frames of image data, cross-correlated image frames and summed image frames. The media 1310 may also include a spatial pattern information 1320, which may which may include Hadamard matrices and/or spatial patterns to be generated by the spatial light modulator.

While not illustrated in FIG. 13, a computing device may additionally have one or more components and peripherals, including input and output devices. These devices can be used, among other things, to present a user interface. Examples of output devices that can be used to provide a user interface include printers or display screens (such as display 606) for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Having thus described several aspects of at least one embodiment, an example of data acquired from Hadamard microscopy is discussed below.

Examples

These examples demonstrate Hadamard microscopy in tissue phantoms, zebrafish brain, and mouse acute brain slice. In the mouse brain slice, $Ca^{2+}$ imaging in a 5×2.5 mm$^2$ field of view, at 2.4 micrometer spatial resolution and 180 ms temporal resolution, recording from up to $10^4$ neurons simultaneously at depths up to ~100 micrometer is illustrated.

Figure 14A:
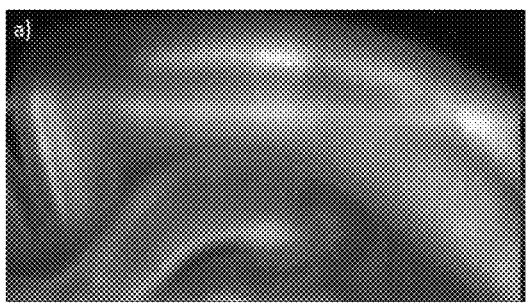
FIG. 14A is a conventional wide-field image of CamKII labeled acute mouse brain slice.
Figure 14B:
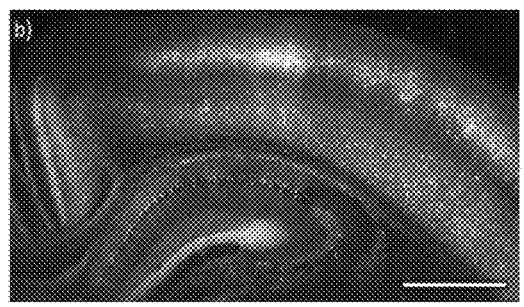
FIG. 14B is a wide-field Hadamard image of CamKII labeled acute mouse brain slice.
Figure 14C:
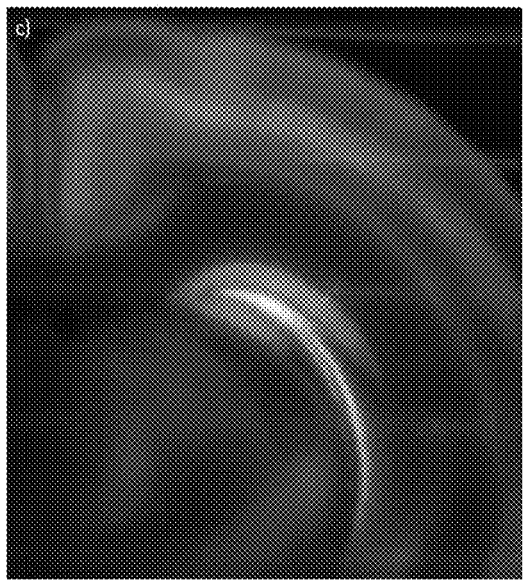
FIG. 14C is a conventional wide-field image of RBP4 labeled acute mouse brain slice.
Figure 14D:
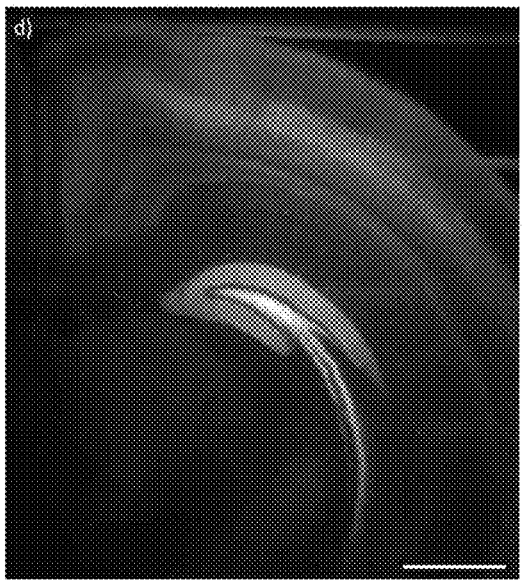
FIG. 14D is a wide-field Hadamard image of RBP4 labeled acute mouse brain slice
Figure 14E:
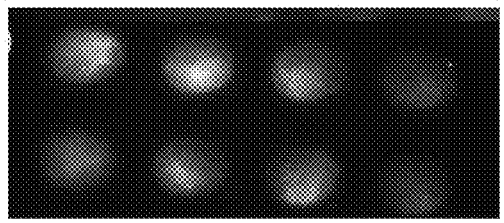
FIG. 14E is a conventional wide-field image of nuclear labeled zebrafish embryos.
Figure 14F:
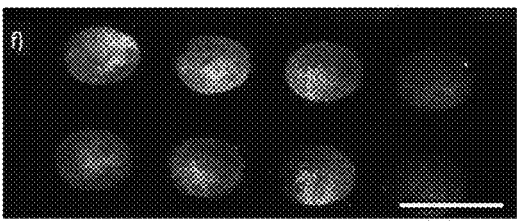
FIG. 14F is a wide-field Hadamard image of nuclear labeled zebrafish embryos.

FIGS. 14A-D illustrate Hadamard microscopy examples in tissue. Image pairs show wide-field and Hadamard images. FIGS. 14A-B illustrate wide-field and Hadamard images, respectively, of CamKII labeled acute mouse brain slice; FIGS. 14C-D illustrate wide-field and Hadamard images, respectively, of RBP4 labeled acute mouse brain slice; FIGS. 14E-F illustrate wide-field and Hadamard images, respectively, of nuclear labeled zebrafish embryos at 10 hours post fertilization. Scale bars are 1 mm.

Figure 15A:
FIG. 15A is a conventional widefield image of an x-z slice plane through hippocampus and cortex of a CamKII labeled acute mouse brain slice.
Figure 15B:
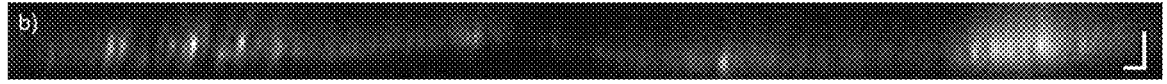
FIG. 15B is a Hadamard image of an x-z slice plane through hippocampus and cortex of a CamKII labeled acute mouse brain slice.

FIGS. 15A-B illustrate how Hadamard imaging rejects widefield background illumination. FIG. 15A is the widefield image and FIG. 15B is the Hadamard image of an x-z slice plane through hippocampus and cortex of a CamKII labeled acute mouse brain slice. This is the same sample shown in FIGS. 14A-B. Scale bars are 100 micrometer.

Figure 16A:
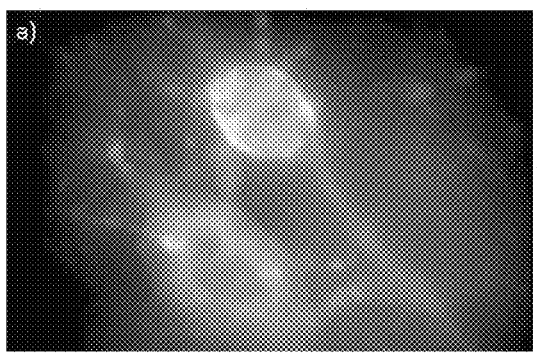
FIG. 16A is a conventional widefield image of a membrane labeled neuron.
Figure 16B:
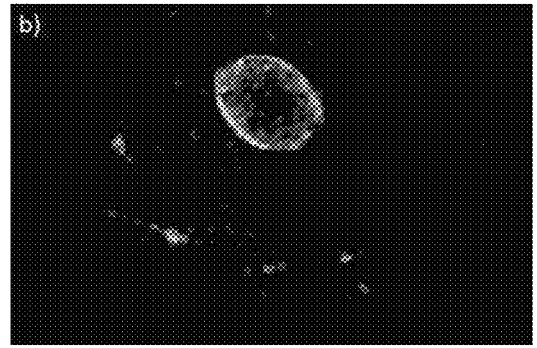
FIG. 16B is a Hadamard image of a membrane labeled neuron.
Figure 16C:
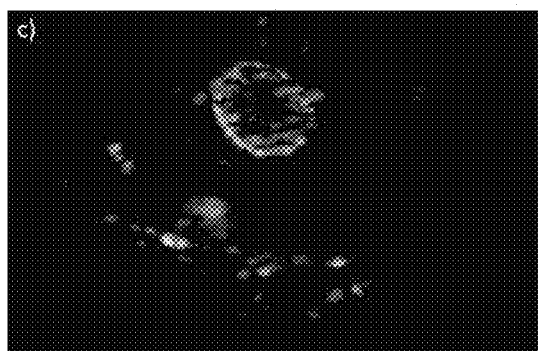
FIG. 16C is an image resulting from structured illumination microscopy used vertically modulated linear patterns.
Figure 16D:
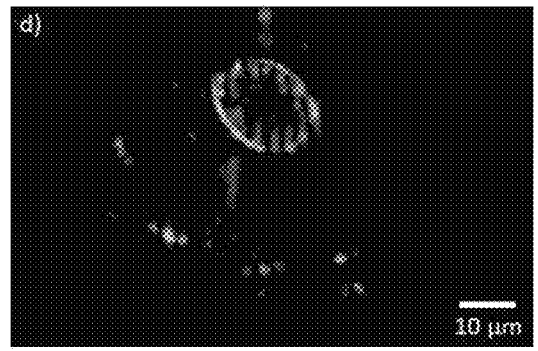
FIG. 16D is an image resulting from structured illumination microscopy used horizontally modulated linear patterns

FIGS. 16A-D show that Hadamard microscopy avoids artifacts in scattering tissue. FIG. 16A is a widefield image and FIG. 16B is a Hadamard image. FIGS. 16C-D show images resulting from structured illumination microscopy with linear patterns results in artifacts. FIG. 16C used vertically modulated linear patterns and FIG. 16D used horizontally modulated linear patterns. The sample is a membrane labeled neuron at 24 micrometer depth within a fixed mouse brain slice, and was imaged at 20× magnification. The scale bar is 10 micrometer.

Figure 17A:
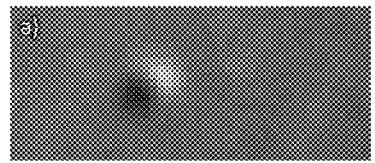
FIG. 17A is an activity in acute brain slice $Ca^{2+}$ activity measurements acquired using one embodiment.
Figure 17B:
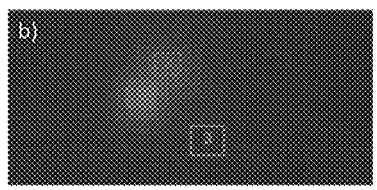
FIG. 17B is an image showing the regions of in acute brain slice $Ca^{2+}$ activity measurements acquired using one embodiment.
Figure 17C:
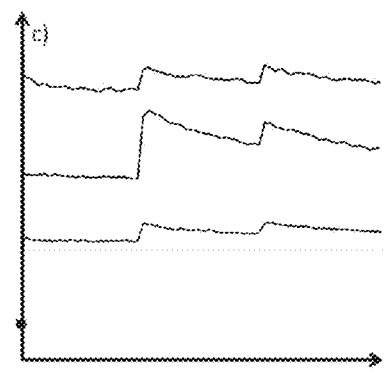
FIG. 17C is a conventional widefield reference activity trace.
Figure 17D:
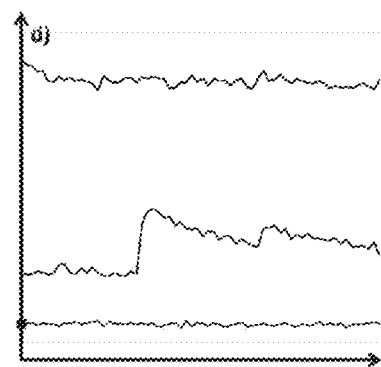
FIG. 17D is a Hadamard optical section activity trace with no background, according to some embodiments.

FIGS. 17A-D show that Hadamard microscopy allows background rejection in acute brain slice $Ca^{2+}$ activity measurements. FIG. 17A is an activity map. FIG. 17B illustrates regions of interest: 1) a bright static cell, 2) an active cell, and 3) a background region. FIG. 17C is a widefield reference activity trace. FIG. 17D is a Hadamard optical section activity trace with no background. FIGS. 17C-D show simultaneous traces for both imaging methods, calculated from the same raw data; the recordings have arbitrary units intensity scale, equal offset marked on the vertical axis, and last 12 s at 5.5 Hz.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. For example, while embodiments based on an epifluorescence microscope were described in detail, Hadamard microscopy may be used with other types of microscopes. For example, some embodiments may use similar techniques with transmitted and/or scattered light microscopes, such as white light microscopes. In such embodiments, optical sections are created using light that is transmitted through a sample rather than light that is fluorescently emitted by the sample.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    illuminating, in a microscope, a sample with a sequence of two-dimensional spatial patterns using light of a first wavelength, wherein each two-dimensional spatial pattern of the sequence of two-dimensional spatial patterns is near orthogonal to the other two-dimensional spatial patterns of the sequence of two-dimensional spatial patterns, wherein a first two-dimensional spatial pattern is near orthogonal to a second two-dimensional spatial pattern if a correlation coefficient between the first two-dimensional spatial pattern and the second two-dimensional spatial pattern is less than or equal to 0.25;
    capturing image data based on light of a second wavelength emitted by the sample in response to being illuminated by the light of the first wavelength, the image data comprising a plurality of frames, wherein each frame of the plurality of frames is associated with a respective two-dimensional spatial pattern of the sequence of two-dimensional spatial patterns; and
    analyzing, using at least one processor, orthogonal components of each frame of the image data.

2. The method of claim 1, wherein the sequence of two-dimensional spatial patterns is formed using a digital micro-mirror array.

3. The method of claim 1, wherein each two-dimensional spatial pattern of the sequence of two-dimensional spatial patterns is configured such that neighboring locations within the sample are illuminated with orthogonal functions of intensity.

4. The method of claim 1, wherein each two-dimensional spatial pattern of the sequence of two-dimensional spatial patterns is a binary spatial pattern.

5. The method of claim 1, wherein each two-dimensional spatial pattern of the sequence of two-dimensional spatial patterns is based on a Hadamard matrix.

6. The method of claim 1, further comprising analyzing the image data using calibration data that maps each pixel of a two-dimensional spatial light modulator that generates the sequence of two-dimensional spatial patterns to at least one pixel of an imaging device that captures the image data.

* * * * *